Nov. 24, 1942.　　H. F. SHEPHERD　　2,302,976
CONTROLLING MEANS FOR TWO CYCLE INTERNAL COMBUSTION ENGINES
Filed Jan. 23, 1942　　3 Sheets-Sheet 1

HAROLD F. SHEPHERD
INVENTOR.

BY Lester B. Clarke.
ATTORNEY

Nov. 24, 1942.   H. F. SHEPHERD   2,302,976
CONTROLLING MEANS FOR TWO CYCLE INTERNAL COMBUSTION ENGINES
Filed Jan. 23, 1942   3 Sheets-Sheet 2

HAROLD F SHEPHERD
INVENTOR.

Lester B. Clark.
ATTORNEY.

Nov. 24, 1942.  H. F. SHEPHERD  2,302,976
CONTROLLING MEANS FOR TWO CYCLE INTERNAL COMBUSTION ENGINES
Filed Jan. 23, 1942  3 Sheets-Sheet 3

HAROLD. F. SHEPHERD
INVENTOR.

BY Lester B. Clark.

ATTORNEY.

Patented Nov. 24, 1942

2,302,976

UNITED STATES PATENT OFFICE 2,302,976

CONTROLLING MEANS FOR TWO CYCLE INTERNAL COMBUSTION ENGINES

Harold F. Shepherd, La Grange, Ill., assignor to Lufkin Foundry & Machine Company, Lufkin, Tex.

Application January 23, 1942, Serial No. 427,890

9 Claims. (Cl. 123—74)

This invention is designed to improve the regulation of two cycle gas engines, particularly multicylinder engines of the type utilizing the displacement of the outer end of the power piston to precompress the charge in the outer end of the cylinder or top of base.

The governing of two cycle gas engines by regulating the quantity of the mixture supplied to the cylinders introduces a serious difficulty.

At the lesser fractional loads the quantity of mixture required is so much reduced that the hot exhaust gases sometimes are not adequately scavenged from the cylinder. The resulting charge is very hot.

Subsequent compression and ignition of this excessively hot charge results in an extremely hot cycle with a terminal or exhaust temperature, often sufficiently high to ignite spontaneously the next incoming charge with consequent back fires into the scavenging pump or receiver.

The mixing and heat transfer between the residual products of combustion and the incoming charge is due to turbulence which may be much reduced by lowering the scavenging pressure.

The lower limit for scavenging pressure is determined by the size of the ports which it is practicable to cut into the cylinder walls.

Obviously, if the ports are large enough to pass a full charge at a given pressure the pressure may be lowered as the volume of the charge is reduced.

By such reduction of pressure and velocity the fractional charge is introduced with less turbulence and less heating. Also, less negative work is required in the pump, reducing the mean effective pressure and the temperature produced in the main cylinder for the required power output.

These objectives may be accomplished in some degree by simply throttling the scavenging pumps at their intakes, but the structure described herein operates with the extreme minimum of negative or pump work, no great vacuum is drawn upon the suction strokes of the pumps and it has proven a very accurate means of regulating two cycle gas engines.

A further object of this construction is to provide for mixing the charging pump outputs so that each cylinder receives a like quality of mixture thus preventing the failure of one or more cylinders to fire under very light loads.

Other and further objects of the invention will be readily apparent when the following description is considered in connection with the accompanying drawings wherein.

Figure 1:
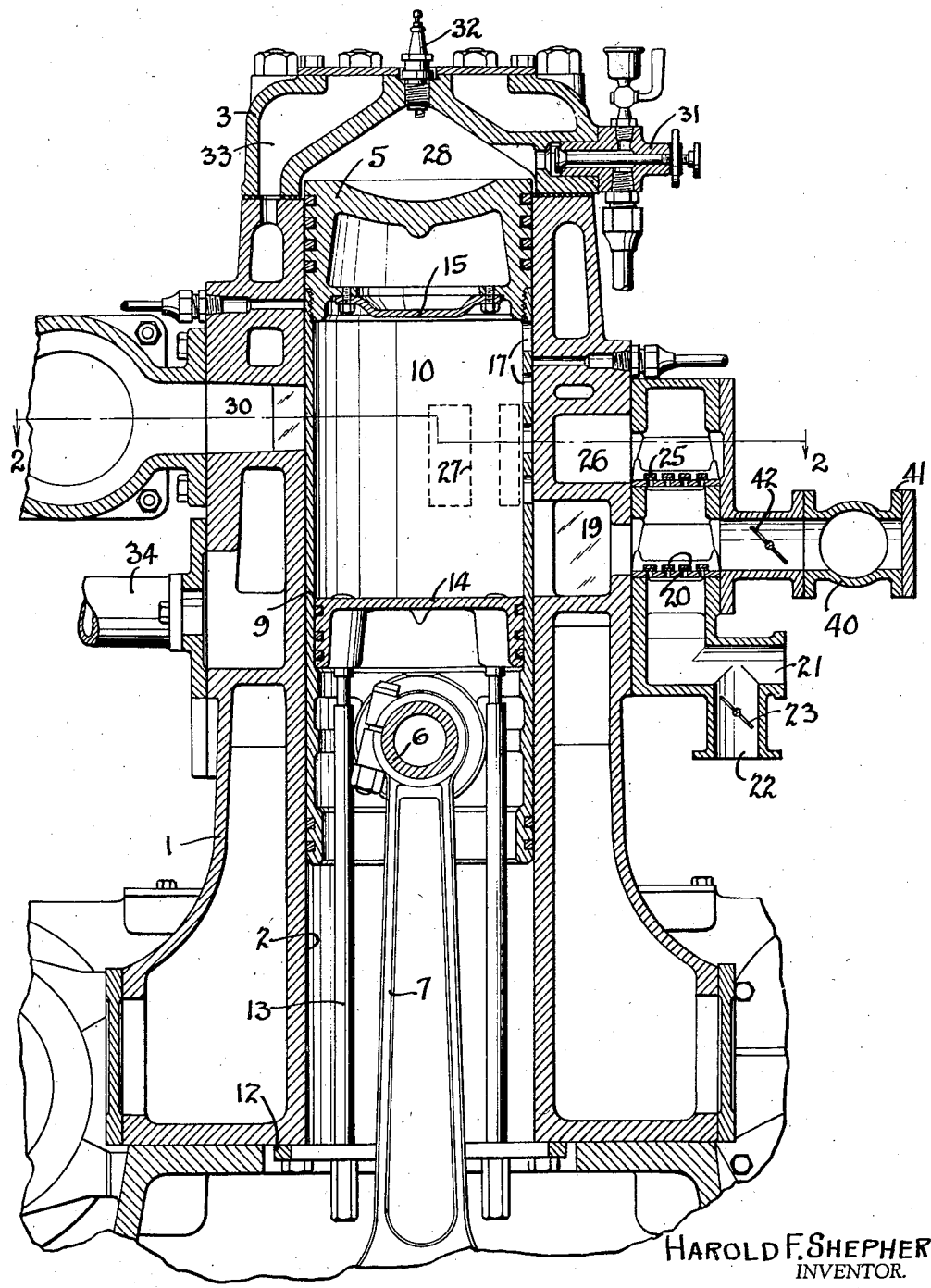
Fig. 1 is a vertical sectional view through a cylinder of the control manifold of a two-cycle piston pump internal combustion engine.
Figure 2:
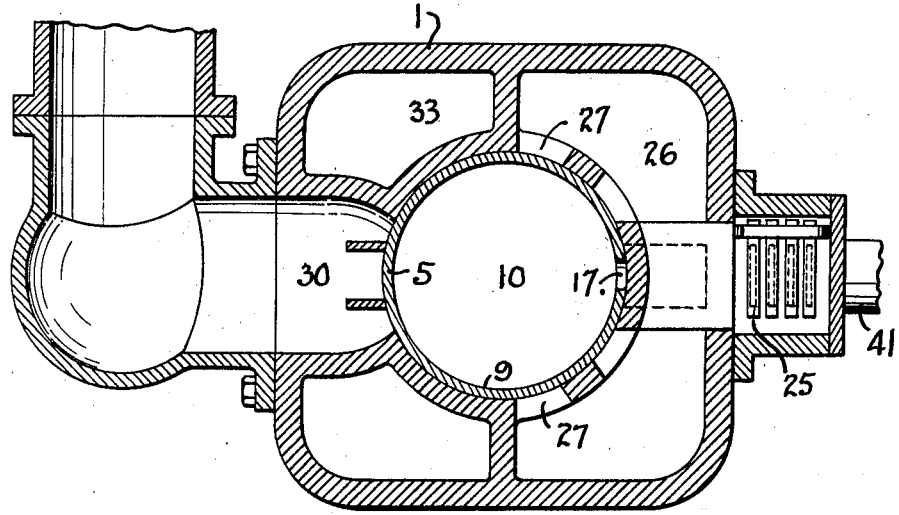
Fig. 2 is a transverse section taken on the line 2—2 of Fig. 1.

Fig. 1 illustrates the general arrangement and construction of the device wherein the engine frame 1 is shown as including a cylinder 2 whose upper end is closed by the head 3. This cylinder has a piston 5 mounted therein for reciprocation by the wrist pin 6 and the connecting rod 7 which are connected, in turn, to the crank shaft 8.

The piston 5 is of peculiar construction in that it has an elongated skirt 9 which is hollow to provide a pump or precompression chamber 10 therein. The frame 2 carries a plate 12 which serves to support a sack of rods 13 which in turn carry a precompression head 14 disposed in the skirt 9 of the piston and defining the lower end of the precompression chamber 10. A plate 15 serves to close the upper portion of the piston head.

As the piston 5 reciprocates upon rotation of the crank shaft and movement of the connecting rod 7, it seems obvious that the piston, upon downward movement, will compress any fluid in the chamber 10 because the precompression head 14 is held stationary, while on the upstroke of the piston there will be a suction into the chamber 10.

The skirt 9 of the piston has a series of openings 17 in one side thereof which can move into and out of alignment with the port 18 which leads into the by-pass chamber 19.

The flow into and out of the chamber 19 is controlled by the flap valves 20 which open when a suction occurs in the by-pass chamber 19 so as to draw in a charge of air through the passage 21 and a charge of fuel from the passage 22. The amount of fuel is controlled by the throttle valve 23. The flap valves 20 tend to close when the pressure in the chamber 18 exceeds that in the inlets 21 and 22 so that whenever there is sufficient reduction of pressure in the by-pass manifold and the precompression chamber 20 additional fuel and air will be drawn into the engine.

As the piston moves down on the compression stroke it seems obvious that the fluid in the chamber 10 will be compressed and forced into the by-pass 19. The valves 20 are now closed and the upper valves 25 will open upon the occurrence of a predominant pressure in the by-pass. These valves 25 admit the precompressed mixture into the passages 26 leading to the ports 27 in the combustion chamber 28. The ports 27 are uncovered by the upper end of the piston 5 as it approaches the lower end of its stroke.

As the piston moves down it will first uncover the upper portion of the ports 27 and at about the same time it will uncover the exhaust port 30 so that the discharge of the burnt gases will be effected. The elevation of the ports 27 and 30 are such that there will be a tendency to completely scavenge the combustion chamber 28 because the incoming explosive mixture has been precompressed and will tend to drive the spent gases out through the exhaust port 30.

A primer device 31 may be connected to the engine and the spark plugs are shown at 32. A water jacket 33 may be provided for the engine by means of the circulating pipe 34 connected to the engine.

In actual practice it has been found that engines of the type herein described generally operate quite satisfactorily at full load but that when less than full load is carried by the engine, that the amount of precompression in the chamber 10 and the manifold 19 does not materially vary and therefore it is difficult to obtain smooth or uniform operation of the engine at lower speed. This is believed to be due to the fact that the same amount of precompression occurs and therefore an uncontrolled amount of explosive mixture enters the combustion chamber.

In the present invention it is intended that the size or capacity of the by-pass 19 can be varied in accordance with the load on the engine.

It seems obvious that if the by-pass 19 is of considerable size that the precompression charge entering the by-pass from the combustion chamber 10 would be dissipated therein to a considerable extent.

On the other hand, if the by-pass chamber were small the precompressed pressure would be dissipated by leaking. If the two charges therefore contain the same proportion of fuel, it seems clear that the charge with the higher pressure would conduct a greater amount of fuel into the cylinder and therefore it is intended that the size of the by-pass may be varied so as to act as a control for the amount of fuel to be admitted to the combustion chamber.

Fig. 1 shows a manifold 40 which has been connected to the by-pass 19. This manifold is in the form of a housing 41 which extends along the cylinder frame 1 and is connected to each of the by-passes at each of the cylinders. In other words, this manifold serves to connect the by-passes of the cylinders. If the connection to the manifold at each cylinder is closed, then, of course, each cylinder operates independently upon its own precompressed explosive mixture. When an engine is working at full load this is desirable and is an ideal condition. When, however, the engine is operating at less than full load it is desirable to dissipate some of the precompressed explosive mixture and a control valve, such as 42, is provided in the entry to the manifold at each cylinder. If this valve 42 is closed the manifold is cut off from each of the cylinders. If the valve 42 is partially open, then part of the precompressed mixture from one cylinder can flow into the manifold so that part of the pressure is dissipated and when the piston in the cylinder admits its charge of precompressed explosive mixture, that mixture is under a lesser pressure than it would have been if the valve 42 had been closed.

At the same time, one of the adjacent cylinders being on the suction stroke, will tend to draw some of its charge through the valve 42 of the cylinder into the precompression chamber. In this manner there will be less air and fuel drawn in through the inlets 21 and 22 to be added to the fuel which is already in an explosive condition in the precompressed air in the bypass. In other words, while one cylinder is under precompression the other is under suction and as a result one compensates the other and there is a general reduction in the pressure on the precompressed explosive mixture. It seems obvious that if the valves 42 are suitably controlled that the operation of the engine can be accordingly governed.

Figures 5, 6:
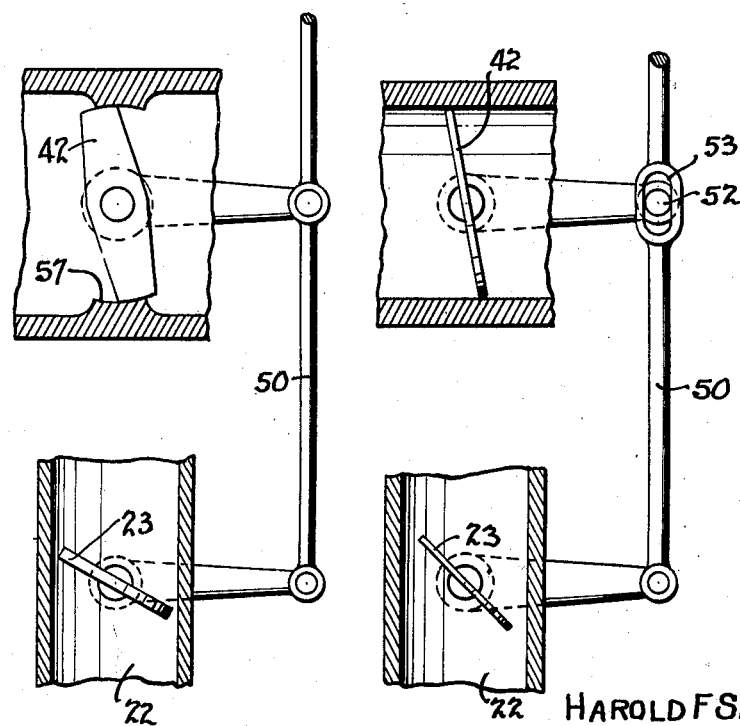
Fig. 5 is a broken detailed sectional view to diagrammatically illustrate the connection of the throttle and the control valves with the lost motion device.
Fig. 6 is a broken detailed sectional view of a modified form of the control valve connected to the throttle.

It has been found that it is desirable to close the valves 42 when the throttle valve 23 is open and to open the control valve 42 in proportion to the amount of closing of the throttle valve 23. Figs. 5 and 6 therefore show the control valves 42 and the throttle valves 23 as connected together with the linkage 50 so that they operate in substantial unison.

Figure 3:
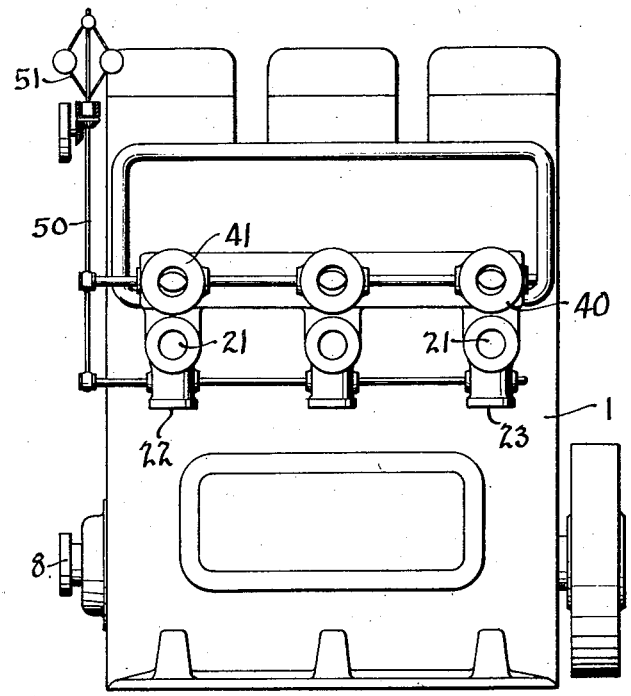
Fig. 3 is a side elevation of the engine with the control manifold connected thereto.
Figure 4:
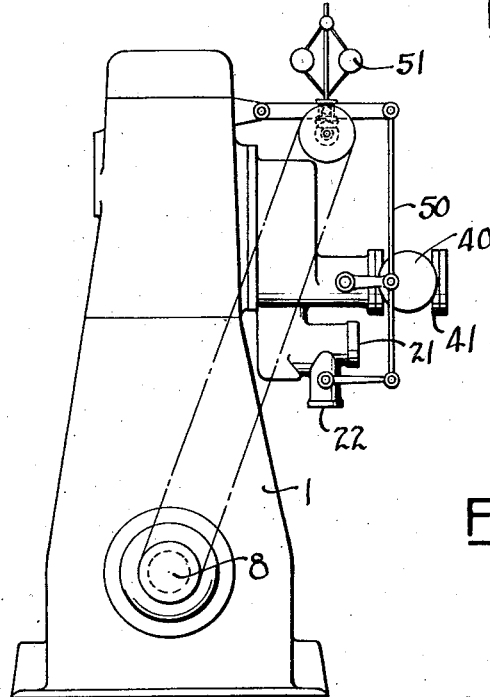
Fig. 4 is an end view of the engine of Fig. 3 showing the control manifold connected to the engine.

Figs. 3 and 4, in turn, show the linkage 50 as being actuated by a governor 51 driven from the crank shaft 58 so that the engine will feed itself automatically and can be adjusted for the desired operation.

Under most conditions an engine of this type will operate satisfactorily and smoothly until the load is reduced to about three-quarters of full load and it is therefore desirable that the by-pass capacity be not changed until the load drops below three-quarters. To this end, therefore, the control valve 42 of Fig. 5 has been shown as connected by a pin 52 and slot 53 to the ring 50 so that the throttle valve 23 can be moved a predetermined amount before the control valve 42 either opens or closes. In this manner there will be a certain amount of lost motion in the operation during which time the control valve will not be moved.

Fig. 6 shows a modified mechanism for accomplishing this same result but providing the valve seat 57 to receive the control valve 42. It will be noted that the valve of Fig. 6 has considerable thickness and that the seat 57 is of substantial width so that the valve can move through a considerable angle before it actually opens and will remain closed for a substantial period during movement of the valve 42. This accomplishes the same purpose as the lost motion mechanism.

In actual operation it has been found that the mechanism here described results in a satisfactorily operated engine and the invention therefore contemplates broadly a control mechanism for engines of the type described wherein the capacity of the by-pass can be varied.

What is claimed is:

1. A two-cycle multi-cylinder piston-pump engine including a frame, cylinders and hollow pistons therein, a precompression pump head in each piston forming a pump chamber, means for each cylinder to by-pass the precompressed fluid from the pump chamber to the combustion chamber, a throttle valve to control incoming fuel, a manifold connecting all of said means together, and a control valve between each of said means and said manifold operable to close at full load and to open at less than full load so that a surge of the precompressed fluid may occur from one pump to another to reduce the quantity of fuel drawn into the engine and the volume of explosive mixture pumped to the cylinders at less than full load.

2. A two-cycle multi-cylinder piston-pump engine including a frame, cylinders and hollow pistons therein, a precompression pump head in each piston forming a pump chamber, means for each cylinder to by-pass the precompressed fluid from the pump chamber to the combustion chamber, a throttle valve to control incoming fuel, a manifold connecting all of said means together, a control valve between each of said means and said manifold operable to close at full load and to open at less than full load so that a surge of the precompressed fluid may occur from one pump to another to reduce the quantity of fuel drawn into the engine and the volume of explosive mixture pumped to the cylinders at less than full load, and additional means connecting said throttle and control valves for operation.

3. A two-cycle multi-cylinder piston-pump engine including a frame, cylinders and hollow pistons therein, a precompression pump head in each piston forming a pump chamber, means for each cylinder to bypass the precompressed fluid from the pump chamber to the combustion chamber, a throttle valve to control incoming fuel, a manifold connecting all of said means together, a control valve between each of said means and said manifold operable to close at full load and to open at less than full load so that a surge of the precompressed fluid may occur from one pump to another to reduce the quantity of fuel drawn into the engine and the volume of explosive mixture pumped to the cylinders at less than full load, and additional means connecting said throttle and control valves for operation including lost motion mechanism to determine the proportion of less than full load at which said manifold is opened.

4. A two-cycle multi-cylinder piston-pump engine including a frame, cylinders and hollow pistons therein, a precompression pump head in each piston forming a pump chamber, means for each cylinder to bypass the precompressed fluid from the pump chamber to the combustion chamber, a throttle valve to control incoming fuel, a manifold connecting all of said means together, and a control valve between each of said means and said manifold operable to close at full load and to open at less than full load so that a surge of the precompressed fluid may occur from one pump to another to reduce the quantity of fuel drawn into the engine and the volume of explosive mixture pumped to the cylinders at less than full load, said control valve having an extended seat to effect opening to the manifold only after a predetermined movement of said control valve.

5. In a two-cycle multi-cylinder internal combustion engine, a precompression construction for the fuel and air wherein the precompressed mixture is bypassed from the compression chamber to the combustion chamber, means to vary the capacity of said bypass including a manifold, and additional means to control the amount of surge into and out of said manifold during the compression and suction periods of precompression so that at less than full load a proportional amount of fuel and air will be drawn into the engine.

6. In a two-cycle multi-cylinder internal combustion engine, a precompression construction for the fuel and air wherein the precompressed mixture is bypassed from the compression chamber to the combustion chamber, means to vary the capacity of said bypass including a manifold, and additional means to control the amount of surge into and out of said manifold during the compression and suction periods of precompression so that at less than full load a proportional amount of fuel and air will be drawn into the engine, said additional means being operable in conjunction with the engine throttle.

7. A control manifold for two-cycle multi-cylinder internal combustion engines of the precompression type where the explosive mixture is compressed and bypassed to the combustion chamber including a manifold housing connected to the engine and opening into the bypasses for the cylinders so that on the suction stroke for precompression of one cylinder at least some of the precompressed mixture of another cylinder may be taken in when the engine is operating at less than full load so as to thereby reduce the amount of fuel drawn into the engine, to reduce the amount of precompression, and to allow some of the precompressed mixture to surge back and forth from the bypass of one cylinder to the bypass of another through said housing.

8. A control manifold for two-cycle multi-cylinder internal combustion engines of the precompression type where the explosive mixture is compressed and bypassed to the combustion chamber including a manifold housing connected to the engine and opening into the bypasses for the cylinders so that on the suction stroke for precompression of one cylinder at least some of the precompressed mixture of another cylinder may be taken in when the engine is operating at less than full load so as to thereby reduce the amount of fuel drawn into the engine, to reduce the amount of precompression, and to allow some of the precompressed mixture to surge back and forth from the bypass of one cylinder to the bypass of another through said housing, and means to control the amount of surge of explosive mixture.

9. A control manifold for two-cycle multi-cylinder internal combustion engines of the precompression type where the explosive mixture is compressed and bypassed to the combustion chamber including a manifold housing connected to the engine and opening into the bypasses for the cylinders so that on the suction stroke for precompression of one cylinder at least some of the precompressed mixture of another cylinder may be taken in when the engine is operating at less than full load so as to thereby reduce the amount of fuel drawn into the engine, to reduce the amount of precompression, and to allow some of the precompressed mixture to surge back and forth from the bypass of one cylinder to the bypass of another through said housing, and means to control the amount of surge of explosive mixture including a control valve for each bypass to close the bypass to the manifold at full load and to open the bypass at less than full load inversely in proportion to the fuel admission.

HAROLD F. SHEPHERD.